US008622476B2

(12) United States Patent
Karremans et al.

(10) Patent No.: US 8,622,476 B2
(45) Date of Patent: Jan. 7, 2014

(54) CHILD VEHICLE SEAT (75) Inventors: Taco Karremans, Eindhoven (NL);
Petrus Henricus Maria Stokman,
Hoensbroek (NL)

(73) Assignee: Cosco Management, Inc., Wilmington, DE (US)

( * ) Notice: Subject to any disclaimer, the term of this patent is extended or adjusted under 35 U.S.C. 154(b) by 884 days.

(21) Appl. No.: 12/726,198

(22) Filed: Mar. 17, 2010

(65) Prior Publication Data
US 2010/0264705 A1 Oct. 21, 2010

(51) Int. Cl.
*A47C 1/08* (2006.01)

(52) U.S. Cl.
USPC ............ 297/410; 297/250.1; 297/256.1

(58) Field of Classification Search
USPC .................. 297/410, 250.1, 256.1
See application file for complete search history.

(56) References Cited

U.S. PATENT DOCUMENTS

| 3,265,437 | A |   | 8/1966  | Mincieli |
|-----------|---|---|---------|----------|
| 3,910,634 | A |   | 10/1975 | Morris |
| 4,854,639 | A |   | 8/1989  | Burleigh et al. |
| 5,106,158 | A |   | 4/1992  | Dukatz et al. |
| D413,026  | S |   | 8/1999  | Reithmeier |
| 6,030,047 | A | * | 2/2000  | Kain ............................ 297/484 |
| 6,135,553 | A |   | 10/2000 | Lovie et al. |
| 6,139,100 | A |   | 10/2000 | Baskin-Lockman et al. |
| 6,155,638 | A |   | 12/2000 | Bapst |
| 6,273,509 | B1|   | 8/2001  | Reithmeier et al. |
| 6,378,950 | B1|   | 4/2002  | Takamizu et al. |
| D461,320  | S |   | 8/2002  | Sher |
| 6,428,099 | B1|   | 8/2002  | Kain |
| 6,464,294 | B1|   | 10/2002 | Kain |
| 6,481,794 | B1|   | 11/2002 | Kassai et al. |
| 6,485,101 | B2|   | 11/2002 | Kassai et al. |
| 6,491,348 | B1|   | 12/2002 | Kain |
| 6,547,333 | B2|   | 4/2003  | Parenteau et al. |
| 6,623,074 | B2| * | 9/2003  | Asbach et al. ............. 297/250.1 |
| 6,626,493 | B2|   | 9/2003  | Kain |
| 6,688,685 | B2|   | 2/2004  | Kain |
| 6,779,843 | B2|   | 8/2004  | Kain |
| 6,799,807 | B1| * | 10/2004 | Chen ............................ 297/484 |
| 6,857,700 | B2|   | 2/2005  | Eastman et al. |
| 6,908,151 | B2|   | 6/2005  | Meeker et al. |
| 6,986,548 | B2|   | 1/2006  | Santamaria |
| 7,021,710 | B2|   | 4/2006  | Kain et al. |
| 7,055,903 | B2| * | 6/2006  | Balensiefer et al. ..... 297/256.11 |
| 7,195,314 | B2|   | 3/2007  | Spence et al. |
| 7,232,185 | B2|   | 6/2007  | Hartenstine et al. |
| 7,246,852 | B2|   | 7/2007  | Balensiefer |
| 7,303,230 | B2|   | 12/2007 | Munn et al. |
| 7,306,284 | B2| * | 12/2007 | Horton et al. ............. 297/250.1 |

(Continued)

FOREIGN PATENT DOCUMENTS

| DE | 3536206   | A1 | 4/1987 |
| EP | 576847    | A2 | 1/1994 |
| EP | 1433653   | A2 | 6/2004 |
| JP | 2001080397| A  | 3/2001 |

*Primary Examiner* — David Dunn
*Assistant Examiner* — Erika Garrett
(74) *Attorney, Agent, or Firm* — Barnes & Thornburg LLP (57) ABSTRACT

According to the present disclosure, a juvenile vehicle seat includes a base providing a seat bottom, a backrest extending upwardly from the base, and a movable headrest. The headrest is mounted for up-and-down movement on the backrest. The juvenile vehicle seat also includes a headrest-height controller configured to control the height of the movable headrest relative to the backrest.

28 Claims, 7 Drawing Sheets

(56) References Cited

U.S. PATENT DOCUMENTS

| | | |
|---|---|---|
| 7,322,647 B2 | 1/2008 | Munn et al. |
| 7,669,926 B2 * | 3/2010 | Balensiefer ............... 297/256.11 |
| 7,770,979 B2 * | 8/2010 | He ........................... 297/411.36 |
| 8,141,951 B2 * | 3/2012 | Chen ........................ 297/256.11 |
| 2001/0011838 A1 | 8/2001 | Kassai et al. |
| 2002/0043837 A1 * | 4/2002 | Kain ........................... 297/250.1 |
| 2002/0145318 A1 * | 10/2002 | Asbach et al. ............. 297/250.1 |
| 2004/0124676 A1 * | 7/2004 | Kain ........................... 297/250.1 |
| 2005/0082888 A1 | 4/2005 | Williams et al. |
| 2007/0284925 A1 | 12/2007 | Balensiefer |
| 2008/0054695 A1 * | 3/2008 | Lhomme et al. ......... 297/256.12 |
| 2008/0315649 A1 * | 12/2008 | Lhomme et al. ......... 297/256.12 |

\* cited by examiner

CHILD VEHICLE SEAT

PRIORITY CLAIM

This application claims priority to Netherlands Application No. 1036865, filed Apr. 14, 2009.

BACKGROUND

The present disclosure relates to seats for use by children in vehicles, and in particular, to juvenile vehicle seats including a headrest mounted for movement on a seat back. More particularly, the present disclosure relates to a juvenile vehicle seat including an apparatus for raising and lowering the headrest on the seat back.

SUMMARY

According to the present disclosure, a juvenile vehicle seat includes a base providing a seat bottom, a backrest extending upwardly from the base, and a movable headrest. The headrest is mounted for up-and-down movement on the backrest.

In illustrative embodiments, the juvenile vehicle seat cooperates with an underlying seat support to form a child restraint. The juvenile vehicle seat includes a headrest-height controller configured to control the height of the movable headrest relative to the backrest.

In illustrative embodiments, the headrest-height controller includes a headrest lock and a headrest-lock release. The headrest lock includes a movable headrest-retainer rod that is spring-biased into rod-receiving notches formed in a pair of spaced-apart plates included in a rod receiver coupled to a rearward facing surface of the backrest. The headrest-lock release includes a release lever mounted for movement on the headrest at the option of a caregiver to urge the headrest-retainer rod away from the backrest and out of the rod-receiving notches against a biasing force provided by a return spring to free the headrest for up-and-down movement by the caregiver relative to the backrest. In an illustrative embodiment, the release lever is mounted to pivot about a horizontal pivot axis to move the headrest-retainer rod to a disengaged position separated from the rod-receiving notches whenever the caregiver desires to raise or lower the headrest to assume a new position on the backrest.

In illustrative embodiments, the return spring is coupled at a first end thereof to the release lever and at an opposite second end thereof to the headrest. The return spring is a coiled compression spring in an illustrative embodiment. The return spring is arranged to lie wholly within an interior chamber formed in the headrest in one illustrative embodiment. The return spring is arranged to engage a handle included in the release lever in another illustrative embodiment.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
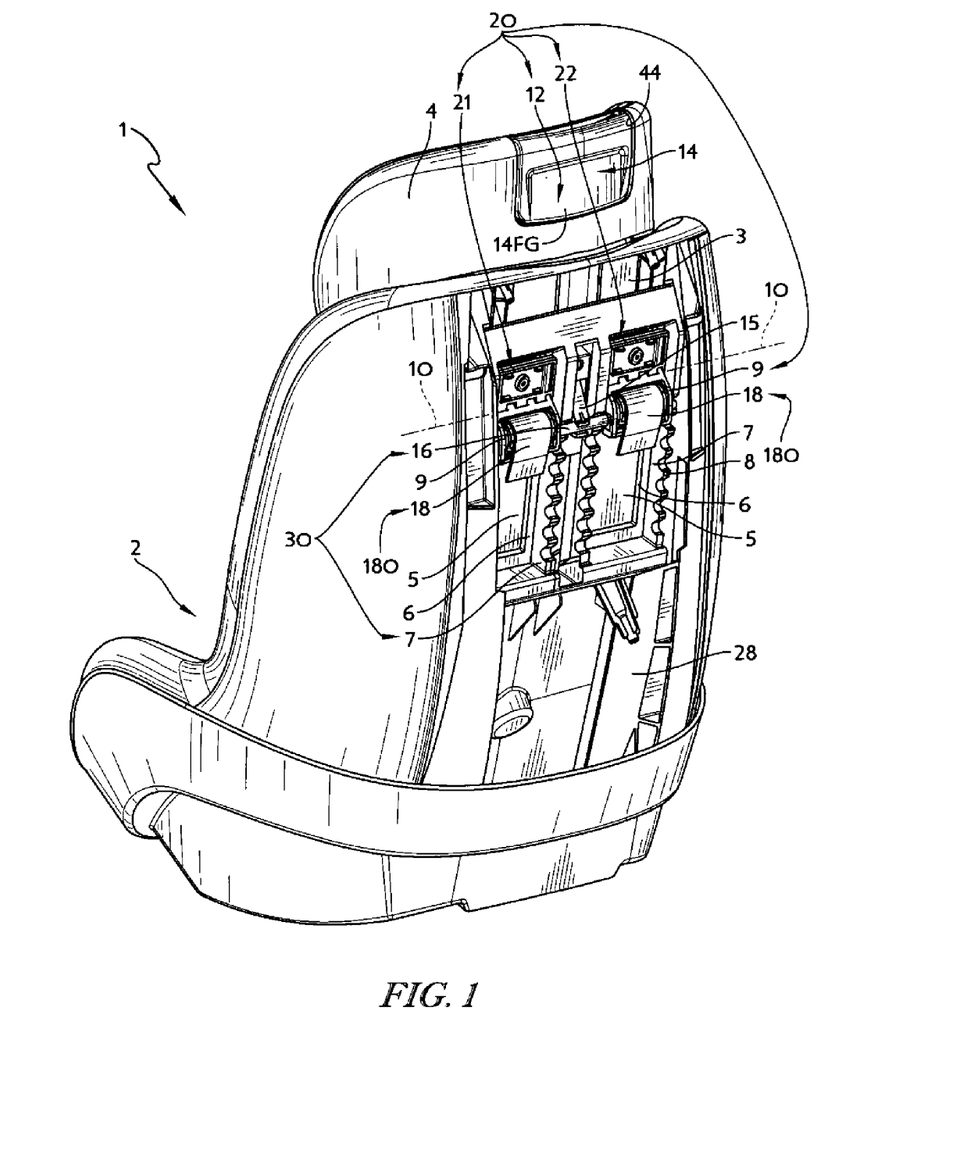
FIG. 1 is a perspective rear view of a child vehicle seat according to the present disclosure, in which the headrest is in its highest position and the locking member is located in the recesses.
Figures 2, 2A:
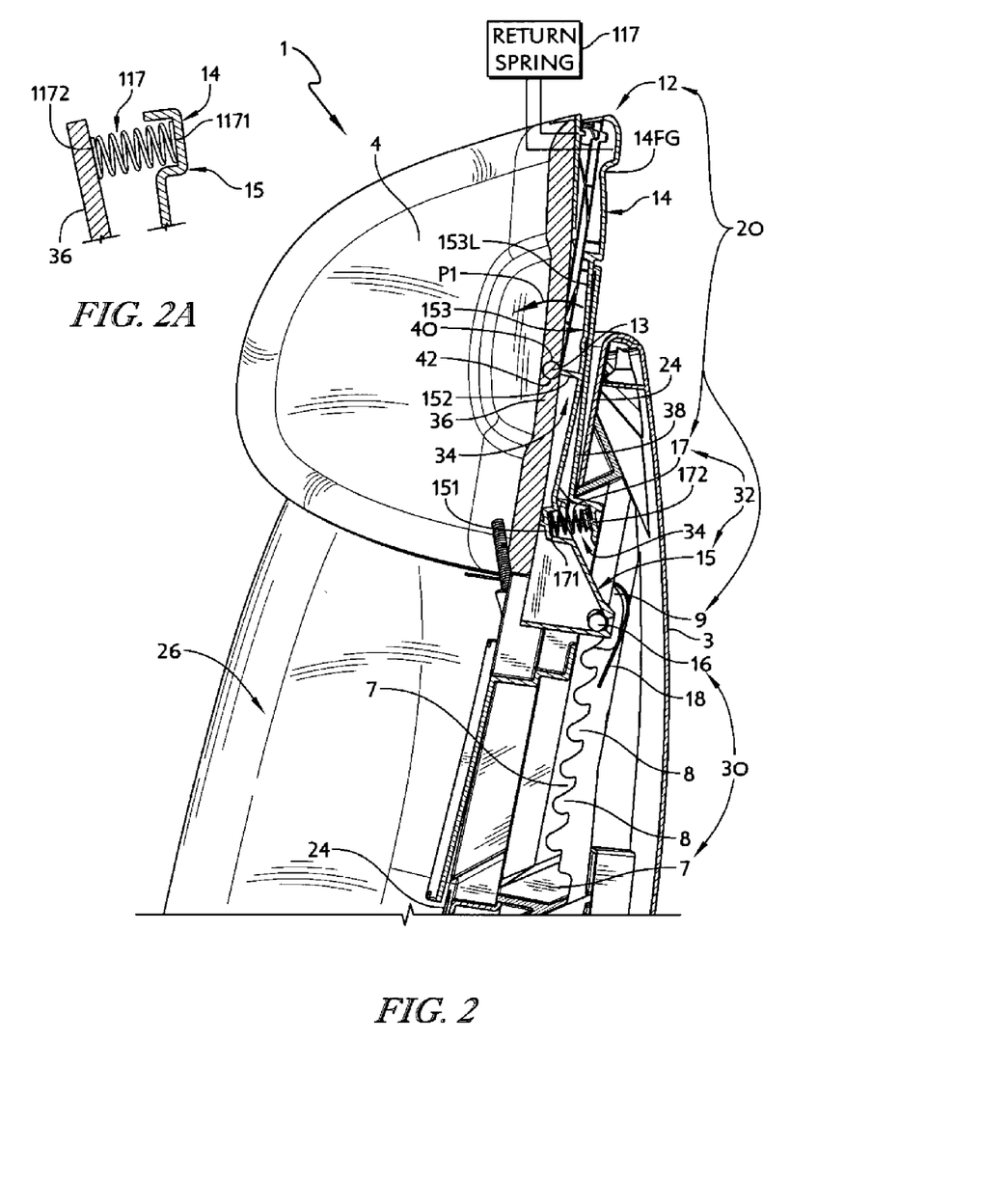
FIG. 2 is an enlarged cross section of the backrest and headrest of the child vehicle seat as shown in FIG. 1.
FIG. 2A is an enlarged sectional view of a portion of the backrest and headrest shown in FIG. 2 showing a return spring located between the headrest and a handle included in a pivotable release lever.
Figure 3:
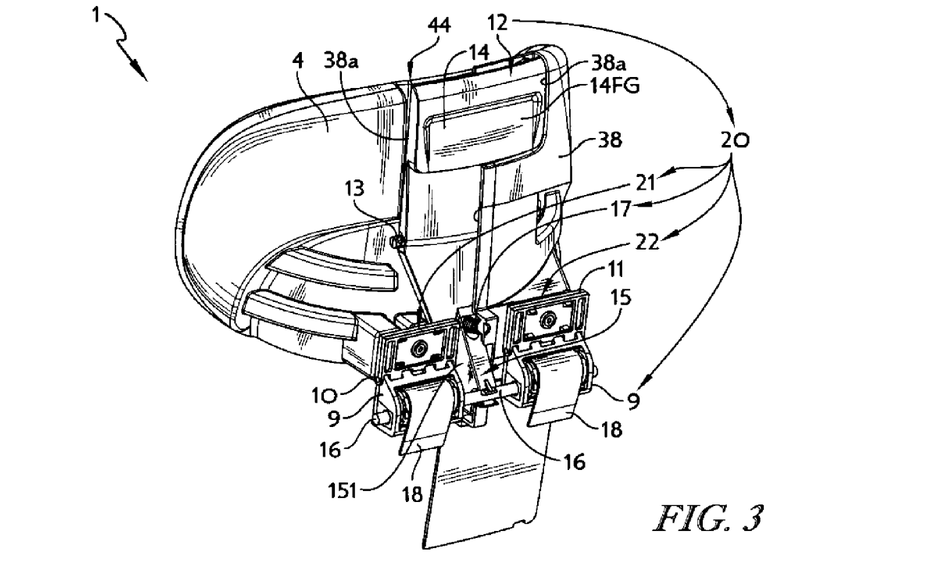
FIG. 3 is an enlarged rear view, partially in cross section, of the headrest of the child vehicle seat as shown in FIG. 1.

Several views of a child vehicle seat 1 in accordance with the present disclosure are shown in FIGS. 1-3. The child vehicle seat 1 comprises a seat portion 2, a backrest 3, a headrest 4 which is movable with respect to the seat portion 2 and the backrest 3, and a headrest-height controller 20. The part of the headrest 4 the child is resting against is located on a front side of the backrest 3. The backrest 3 is provided with two elongated belt-receiving openings 5 which are bounded by flanges 6. Two vertically extending tracks 7 are located at each side of each belt-receiving opening 5. Each track 7 is provided with seven recesses 8, whereby recesses 8 of the four tracks 7 are aligned with each other in horizontal direction.

Figure 6:
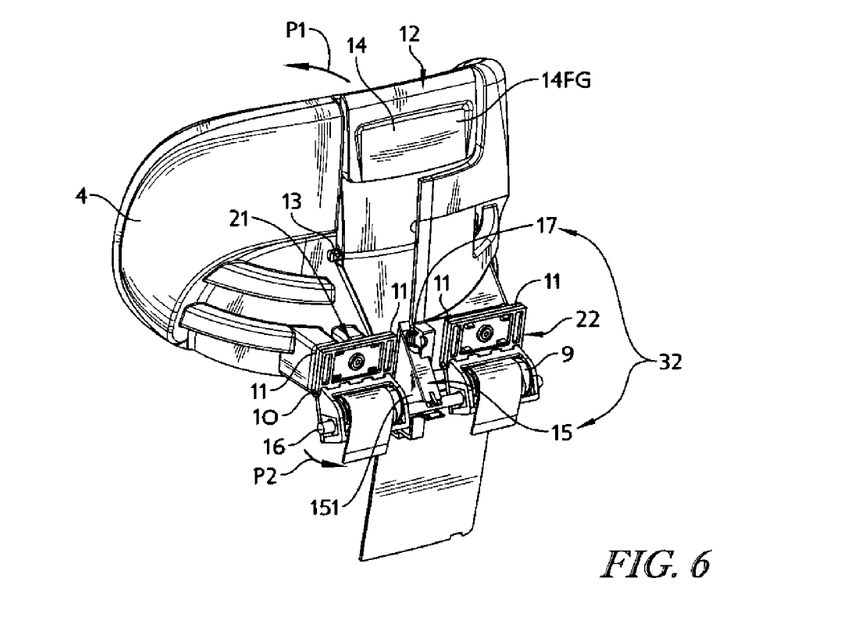
FIG. 6 is an enlarged rear view, partially in cross section, of the headrest of the child vehicle as shown in FIG. 4.

The headrest-height controller 20 is provided with two guide elements 9 being swivelable about a swivel axis 10 with respect to the headrest 4 (see FIG. 6). Above the guide elements 9, as suggested in FIGS. 3 and 6, the headrest-height controller 20 is provided with first and second slidable blocks 21, 22 and each of the slidable blocks 21, 22 includes flanges 11 which are shown in FIGS. 3 and 6 and are slidable along the flanges 6 at a rear side of the backrest 3 as suggested in FIGS. 4, 7, and 8. Each of the slidable blocks 21, 22 is coupled to a companion guide element 9 for swivelable movement about a common swivel axis 10.

The headrest-height controller 20 is also provided with an operating member 12 that is pivotable about a pivot axis 13 with respect to the headrest 4 as suggested in FIGS. 2, 3, 5, and 6. At a side near the top of the headrest 4, the operating member 12 is provided with a handle 14. At a side remote from the handle 14 and on the other side of the pivot axis 13, the operating member 12 comprises a support 15 supporting an elongated rod 16. The rod 16 extends through the guide members 9, thereby supporting the guide members 9. The operating member 12 is relatively simple so that it is easy to manufacture, to mount, and to operate.

In the position of the headrest 4 and the operating member 12 as shown in FIGS. 1-3, the rod 16 is located in four aligned recesses 8 of the four tracks 7. The rod 16 forms a locking member for the headrest 4. A spring 17 is located between the operating member 12 and the headrest 4 at a location between the rod 16 and the pivot axis 13 as suggested in FIGS. 2, 3, 5, and 6. By means of the spring 17, the rod 16 is urged by the operating member 12 towards the recesses 8.

The child seat 1 is provided with a five-point safety belt system. Since such a five-point safety belt system is well known by child vehicle seats, only a portion of the shoulder belts 18 is shown in the figures. The shoulder belts 18 are being guided by the guide elements 9 from the rear side of the backrest 3 through the belt-receiving openings 5 to the front side of the backrest 3.

In the position of the headrest 4 and the operating member 12 as shown in FIGS. 1-3, the headrest 4 is in its highest position whereby the rod 16 is located in the highest recesses 8 of the four tracks 7. Due to the use of four tracks 7 and one single rod 16 which supports the guide elements 9, a reliable and good fixation of the guide elements 9 to the backrest 3 is obtained.

If a user wants to lower the headrest 4, he places his hand on the handle 14 and pulls the handle 14 towards the headrest 4 against the force of the spring 17. Due to said movement, the operating member 12 is being pivoted about the pivot axis 13 in the direction as indicated by arrow P1, whereby the rod 16 will be moved out of engagement with the recesses 8 and the guide elements 9 will be swiveled in the direction as indicated by arrow P2 (FIG. 6).

Figure 4:
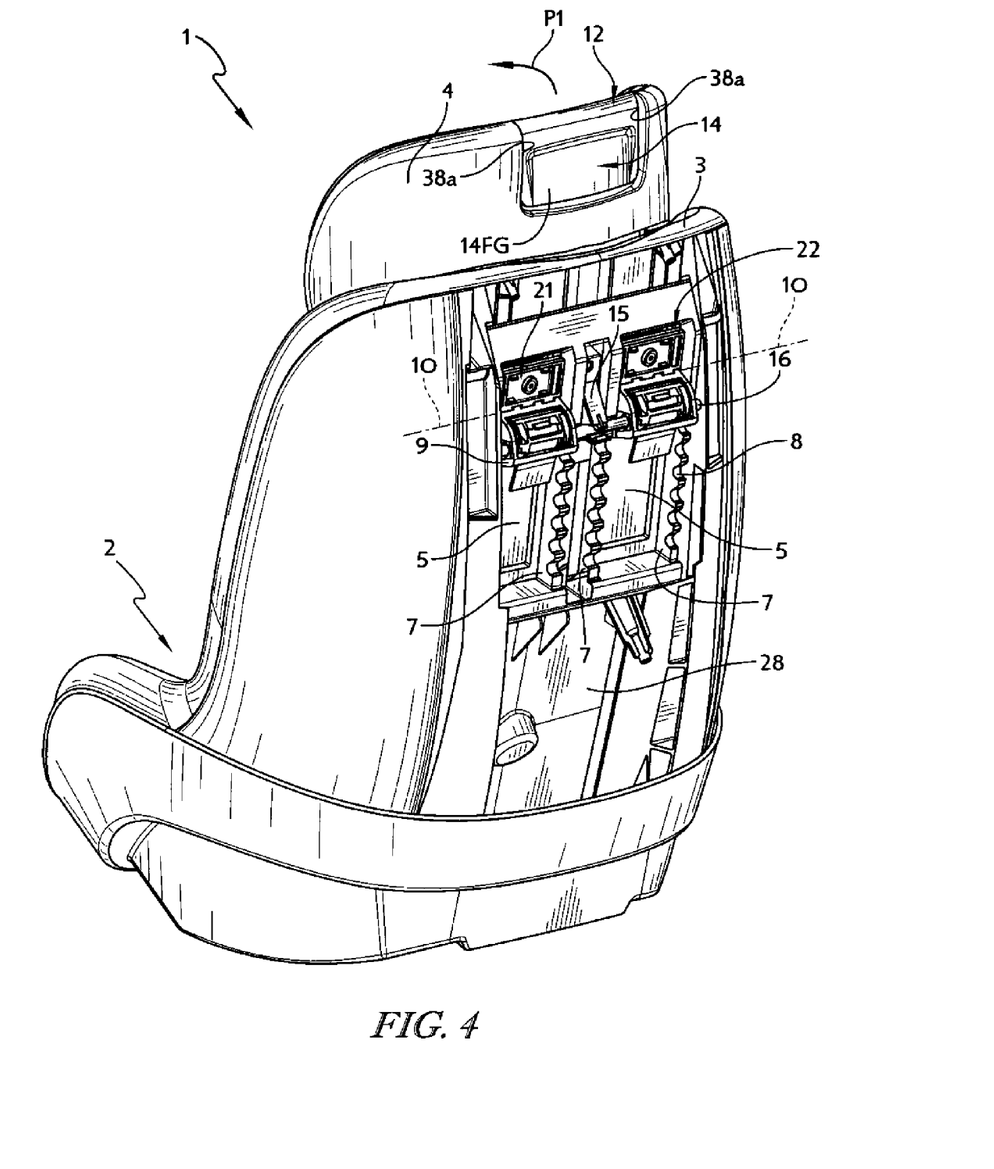
FIG. 4 is a perspective rear view of the child vehicle seat according to the invention, in which the headrest is in its highest position and the locking member is located outside the recesses.
Figure 5:
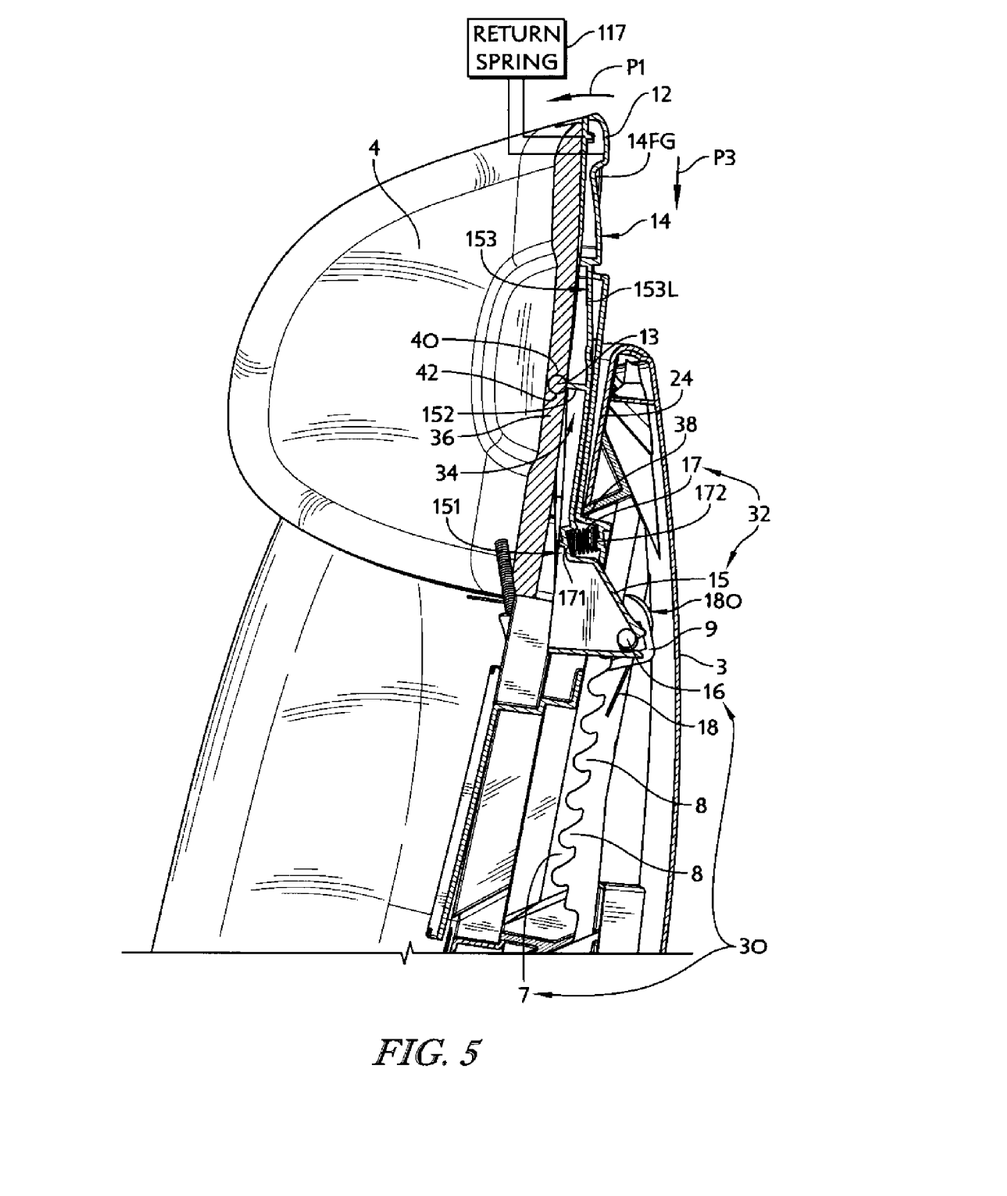
FIG. 5 is an enlarged cross section of the backrest and headrest of the child vehicle seat as shown in FIG. 4.

This position of the headrest 4 and the operating member 12 is shown in FIGS. 4-6. As is clearly visible in FIG. 5, the spring 17 is being compressed.

While maintaining the operating member 12 in the position as shown in FIGS. 4-6, the user can now move the headrest 4 downwardly in the direction as indicated by arrow P3 to adjust the headrest 4 for a smaller child. Simultaneously with the headrest 4, the guide members 9 and the shoulder belts 18 will be moved downwardly so that also the shoulder belts 18 are adjusted to the size of the child.

Figure 7:
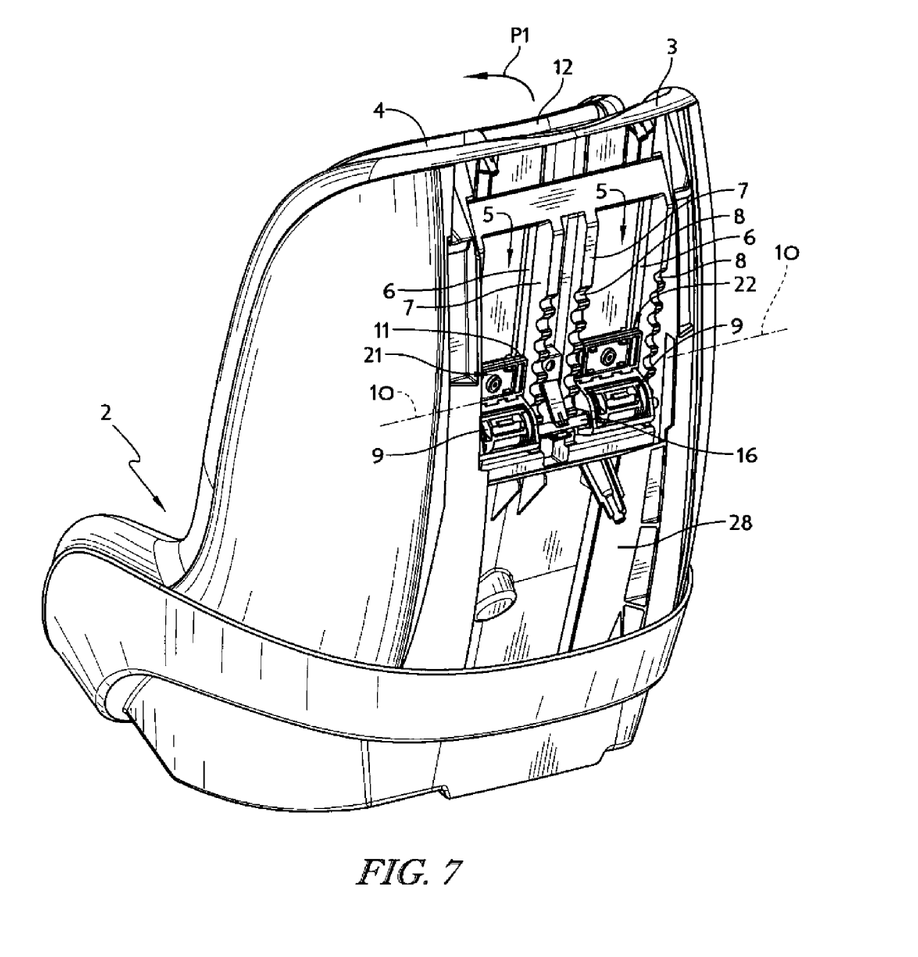
FIG. 7 is a perspective rear view of the child vehicle seat according to the present disclosure, in which the headrest is in its lowest position and the locking member is located outside the recesses.

In FIG. 7, a position of the headrest 4 and the operating member 12 is shown, whereby the rod 16 is located near the lowest recesses 8 but out of engagement therewith.

As soon as the headrest 4 is located at the desired height with respect to the seat part 2, the user removes his hand from the handle 14. Under influence of the spring force of spring 17, the operating member 12 will be pivoted in a direction indicated by arrow P4 being opposite to the direction as indicated by arrow P1 and the rod 16 will be brought into engagement with four aligned recesses 8 of the four tracks 7.

Figure 8:
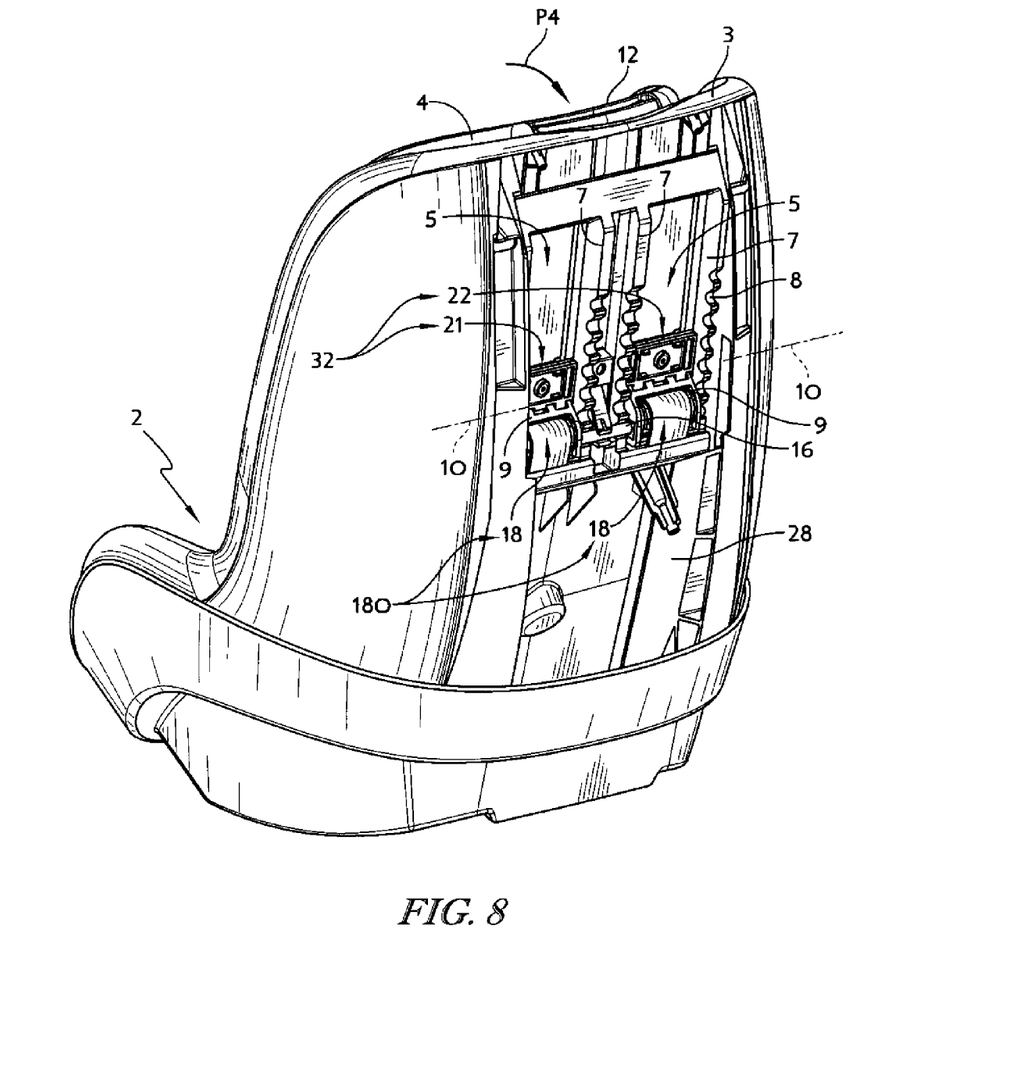
FIG. 8 is a perspective rear view of the child vehicle seat according to the present disclosure, in which the headrest is in its lowest position and the locking member is located in the recesses.

In FIG. 8, a position of the headrest 4 and the operating member 12 is shown, whereby the rod 16 is in engagement with the lowest recesses 8. It is also possible to use less or more tracks 7 or to provide the tracks 7 with more or less recesses 8.

In illustrative embodiments, each of first and second shoulder belts 18, 18 is guided by means of a guide element 9 that is supported for up-and-down movement relative to backrest 3 by rod 16 as rod 16 is moved relative to backrest 3 by operating member 12. By moving rod 16 from one recess 8 to another recess 8, headrest 4 will be moved to another vertical position. Since guide elements 9 are being supported by rod 16, guide elements 9 and therefore both shoulder belts 18, 18 will be adjusted simultaneously with headrest 4.

In illustrative embodiments, each guide element 9 is swivelable about a swivel axis 10 relative to headrest 4. Since each guide element 9 is swivelable with respect to headrest 4, each guide element 9 can be moved with respect to headrest 4 if rod 16 is pivoted about pivot axis 13.

In illustrative embodiments, backrest 3 is formed to include openings 5 and each guide element 9 is aligned with one of openings 5. In such a manner, shoulder belts 18, 18 can be guided easily through openings 5, 5 from the back side of backrest 3 to the front side of backrest 3.

In illustrative embodiments, along both sides of opening 5, a track 7 formed to include at least two recesses 8 is provided. By having more than one track 7 on backrest 3, rod 16 can be engaged in several recesses 8 at the same time to provide a reliable connection between rod 16 and backrest 3. Illustratively, tracks 7 extend parallel to one another.

In illustrative embodiments, at least one spring 17 is arranged to extend between headrest 4 and operating member 12 to urge rod 16 into engagement with one of the recesses 8. Due to spring 17, rod 16 will be kept in a recess 8 and only when a force is applied on rod 16 which will overcome spring 17 will rod 16 be moved out of recess 8.

A child restraint 1 in accordance with the present disclosure includes a seat shell 22, a headrest 4, and a headrest-height controller 20 as suggested in FIGS. 1-4. Headrest 4 is mounted for up-and-down movement on backrest 4 relative to backrest 3 as suggested in FIGS. 4 and 8.

Seat shell 22 includes a base 2 providing a seat bottom on which a child may sit and a backrest 3 extending upwardly from base 2 as suggested in FIG. 1. Backrest 3 has a front portion 24 facing toward a child seated on the seat bottom and cooperating with the seat bottom to form a child-receiving space 26 above the seat bottom as suggested in FIG. 2. Backrest 3 also has a rear portion 28 facing away from a child seated on the seat bottom and located in child-receiving space 26 as suggested in FIG. 1.

Headrest-height controller 20 includes a headrest lock 30 and a headrest-lock release 32 as suggested in FIGS. 1 and 2. Headrest-lock release 32 is operable by a caregiver to lock and unlock headrest lock 30.

Headrest lock 30 includes a rod receiver 7 coupled to rear portion 28 of backrest 3 and arranged to extend away from front portion 24 of backrest 3 as suggested in FIGS. 1 and 2. Headrest lock 30 is formed to include a series of rod-receiving notches 8 having openings facing away from headrest 14. Each rod-receiving notch 8 is located at a different elevation above the seat bottom provided in base 2.

Headrest lock 30 also includes a headrest-retainer rod 16 as suggested in FIGS. 1-3. Headrest-retainer rod 16 is arranged to move relative to rod receiver 7 between a locked position engaging a selected first of the rod-receiving notches 8 of rod receiver 7 to retain headrest 4 in a selected position on backrest 3 to establish the elevation of headrest 4 above the seat bottom provided in base 2 as suggested in FIG. 8 and an unlocked position disengaging rod-receiving notches 8 formed in rod receiver 7 to free headrest 4 for up-and-down movement relative to backrest 3 to assume a different selected fixed position on backrest 3 associated with a selected second of the rod-receiving notches 8 to establish a new elevation of headrest 4 above the seat bottom provided in base 2 as suggested in FIG. 7.

Headrest-lock release 32 includes a release lever 15 and a return spring 17 as shown, for example, in FIGS. 2 and 3. Release lever 15 is mounted for pivotable movement on and relative to headrest 4 about a horizontal pivot axis 13 in response to application of a pivot-inducing force to release lever 15 by a caregiver to move headrest-retainer rod 16 in a direction away from rear portion 28 of backrest 3 and relative to rod receiver 7 from the locked position to the unlocked position as suggested in FIG. 5. In one illustrative embodiment, a return spring 17 is coupled to headrest 4 and release lever 15 and located below horizontal pivot axis 13 as suggested in FIGS. 2 and 5. In another embodiment, a return spring 117 is coupled to headrest 4 and release lever 15 and located above horizontal pivot axis 13 as suggested diagrammatically in FIG. 2 and illustratively in FIG. 2A. It is within the scope of this disclosure to use either one or both of return springs 17, 117.

Return spring 17 is coupled at a first end thereof to headrest 4 and at an opposite second end thereof to release lever 15 as suggested in FIGS. 2 and 5. Return spring 17 is configured to provide means for yieldably urging headrest-retainer rod 16 in a direction toward rear portion 28 of backrest 3 and into a rod-receiving notch 8 upon arrival of headrest-retainer rod 16 in a position confronting the rod-receiving notch 8 once a caregiver lets go of release lever 15 to allow pivoting movement of release lever 15 about horizontal pivot axis 13 so as to retain headrest 4 in a selected one of the fixed positions on backrest 3 as suggested in FIG. 2.

Headrest 4 is hollow and formed to include an interior region 34 as shown, for example, in FIGS. 2 and 5. Return spring 17 is located in interior region 34 as suggested in FIG. 2. Return spring 117 is located outside interior region 34 as suggested in FIG. 2.

Headrest 14 includes a front plate 36 and a rear plate 38 positioned to lie between front plate 36 and front portion 24 of backrest 3 as suggested in FIGS. 2 and 5. Rear plate 38 cooperates with front plate 36 to define interior region 34 of headrest 4 therebetween as suggested in FIGS. 2 and 5.

Release lever 15 is mounted on front plate 36 for movement about horizontal pivot axis 13 in interior region 34 relative to front and rear plates 36, 38 as suggested in FIGS. 2 and 5. Horizontal pivot axis 13 is arranged to extend through a portion of front plate 36.

Return spring 17 is arranged to lie in a space between horizontal pivot axis 13 and headrest-retainer rod 16 as suggested in FIGS. 2 and 5. First end 171 of return spring 17 is coupled to release lever 15. An opposite second end 172 of return spring 17 is coupled to rear plate 38.

Release lever 15 includes a rod mover 151, pivot mount 152, and mover actuator 153 as suggested in FIGS. 2 and 5. Rod mover 151 is arranged to extend through interior region 34 of headrest 4 and coupled to headrest-retainer rod 16 at a location outside of interior region 34 of headrest 4. Pivot mount 152 is coupled to headrest 4 to establish horizontal pivot axis 13 and support rod mover 151 for pivotable movement in interior region 34 of headrest 4 to change the position of headrest-retainer rod 16 relative to rod receiver 7. Mover actuator 153 is arranged to extend through interior region 34 of headrest 4 upwardly from pivot mount 152 and configured to provide a handle 14 arranged to move relative to headrest 4 during pivoting movement of release lever 15 about horizontal pivot axis 13 and configured to be gripped by a caregiver pivoting release lever 15 about horizontal pivot axis 13.

First end 171 of return spring 17 is coupled to rod mover 151 and the opposite second end 172 of return spring 17 is coupled to headrest 4 as suggested in FIGS. 2 and 5. In an illustrative embodiment, second end 172 of return spring 17 is coupled to rear plate 38 of headrest 4.

Pivot mount 152 includes a pivot post 40 as suggested in FIG. 2. Pivot post 40 intersects horizontal pivot axis 13 and extends into a post receiver 42 formed in headrest 4 for rotative bearing engagement therein and for pivotable movement about horizontal pivot axis 13 as suggested in FIGS. 2 and 5.

Headrest 4 is formed to include a handle-receiving chamber 44 as suggested in FIGS. 1 and 3. Handle 14 of mover actuator 153 is arranged to lie above rod-receiving notches 8 formed in headrest lock 30 and to lie and move in handle-receiving chamber 44 during pivoting movement of release lever 15 about horizontal pivot axis 13 as suggested in FIGS. 1-5.

Headrest 4 includes a front plate 36 arranged to face toward a head of a child seated in seat shell 22 on the seat bottom and a rear plate 38 arranged to lie between front plate 36 and backrest 3 as suggested in FIGS. 2 and 5. Rear plate 38 is formed to include a rearward-facing aperture 38a opening into handle-receiving chamber 44 as suggested in FIGS. 2 and 3.

Handle 14 includes a finger-grip portion 14FG exposed in the rearward-facing aperture 38a to be gripped by a caregiver as suggested in FIGS. 1-4. Finger-grip portion 14FG is arranged to be moved toward front plate 36 by a caregiver to cause release lever 15 to pivot about horizontal pivot axis 13 to compress return spring 17 and move headrest-retainer rod 16 from the locked position to the unlocked position as suggested in FIGS. 2-5.

Rear plate 38 and front plate 36 cooperate to form an interior chamber 34 and a lower portion 153L of mover actuator 153 is arranged to extend between pivot mount 152 and handle 14 as suggested in FIGS. 2 and 5. That lower portion 153L of mover actuator 153 is arranged to lie and move in interior chamber 34 during pivoting movement of release lever 15 about horizontal pivot axis 13 and movement of handle 14 in the handle-receiving chamber 34 toward and away from front plate 36 as suggested in FIGS. 2 and 5.

In illustrative embodiments, a first end 1171 of return spring 117 is coupled to headrest 4 and an opposite second end 1172 of return spring 117 is coupled to mover actuator 153 of release lever 15 as suggested in FIG. 2A. As suggested in FIG. 2, mover actuator 153 includes a lower portion 153L arranged to interconnect handle 14 and pivot mount 152 and second end 1172 of return spring 117 is coupled to finger-grip portion 14FG of handle 14. Return spring 117 is arranged to lie in a space provided between headrest 4 and handle 14 as suggested in FIG. 2A.

A child-restraint harness 180 is also included in child restraint 1 and is coupled to seat shell 22 as suggested in FIGS. 1 and 9. Child-restraint harness 180 is configured to include first and second shoulder belts 18, 18 as suggested in FIGS. 1 and 8.

Backrest 3 is formed to include separate first and second belt-receiving channels 5, 5 as suggested in FIGS. 1 and 8. First shoulder belt 18 is arranged to pass through first belt-receiving channel 5 as suggested in FIG. 1. Second shoulder belt 18 is arranged to pass through second belt-receiving channel 5 as suggested in FIG. 1.

Headrest-height controller 20 further includes a first guide element 9 and a first slidable block 21 as suggested in FIGS. 1, 3, and 8. First guide element 9 is coupled to headrest-retainer rod 16 to move therewith relative to backrest 3 and to first shoulder belt 18 as suggested in FIGS. 1 and 8. First slidable block 21 is mounted on backrest 3 to slide up and down relative to the seat bottom of seat base 2 along the first belt-receiving channel 5 formed in backrest 3 as suggested in FIGS. 1 and 8. First guide element 9 is mounted on first slidable block 21 to swivel about a swivel axis 10 relative to first slidable block 21 to cause first slidable block 21 to move up and down along first belt-receiving channel 5 formed in backrest 3 in response to up-and-down movement of first guide element 9 caused by up-and-down movement of headrest-retainer rod 16 relative to rod receiver 7 coupled to backrest 3 as suggested in FIGS. 1 and 8.

Backrest 3 includes first and second flanges 6, 6 arranged to lie in spaced-apart relation to one another and to border first belt-receiving channel 5 formed in backrest 3 as suggested in FIG. 1. First slidable block 21 includes a first flange 11 arranged to slidably engage first flange 6 included in backrest 3 and a second flange 11 arranged to slidably engage second flange 6 included in backrest 3 as suggested in FIGS. 1 and 3. First and second flanges 11, 11 of first slidable block 21 are arranged to lie in substantially spaced-apart parallel relation to one another and in substantially perpendicular relation to swivel axis 10 associated with first slidable block 21 and first guide element 9 as suggested in FIGS. 1 and 3.

The invention claimed is:

1. A child restraint comprising
a seat shell including a base providing a seat bottom and a backrest extending upwardly from the base, the backrest having a front portion facing toward a child seated on the seat bottom and cooperating with the seat bottom to form a child-receiving space above the seat bottom and a rear portion facing away from a child seated on the seat bottom and located in the child-receiving space,
a headrest mounted for up-and-down movement on the backrest, and
a headrest-height controller arranged to adjust the height of the headrest above the seat bottom, wherein the headrest-height controller includes a headrest lock and a headrest-lock release, wherein the headrest lock includes a rod receiver coupled to the rear portion of the backrest and arranged to extend away from the front portion of the backrest, the headrest lock is formed to include a series of rod-receiving notches having openings facing away from the headrest, each rod-receiving notch being located at a different elevation above the seat bottom, and a headrest-retainer rod arranged to move relative to the rod receiver between a locked position engaging a selected first of the rod-receiving notches of the rod receiver to retain the headrest in a selected position on the backrest to establish the elevation of the headrest above the seat bottom and an unlocked position disengaging rod-receiving notches formed in the rod receiver to free the headrest for up-and-down movement relative to the backrest to assume a different selected fixed position on the backrest associated with a selected second of the rod-receiving notches to establish a new elevation of the headrest above the seat bottom, and wherein the headrest-lock release includes a release lever mounted for pivotable movement on and relative to the headrest about a horizontal pivot axis in response to application of a pivot-inducing force to the release lever by a caregiver to push the headrest-retainer rod in a transverse direction away from the rear portion of the backrest and relative to the rod receiver from the locked position to the unlocked position and a return spring coupled at a first end thereof to the headrest and at an opposite second end thereof to the release lever and configured to provide means for yieldably urging the headrest-retainer rod in a direction toward the rear portion of the backrest and into a rod-receiving notch upon arrival of the headrest-retainer rod in a position confronting the rod-receiving notch once a caregiver lets go of the release lever to allow pivoting movement of the release lever about the horizontal pivot axis so as to retain the headrest in a selected one of the fixed positions on the backrest.

2. The child restraint of claim 1, wherein the release lever includes a pivot mount including a pivot post intersecting the horizontal pivot axis and extending into a post receiver formed in the headrest for rotative bearing engagement therein and pivotable movement about the horizontal pivot axis, a rod mover extending downwardly from the pivot mount in a direction toward the seat base to engage the headrest-retainer rod, and a mover actuator extending upwardly from the pivot mount in a direction away from the seat base and providing a handle arranged to move relative to the headrest during pivoting movement of the release lever about the horizontal pivot axis and configured to be gripped by a caregiver pivoting the release lever about the horizontal pivot axis.

3. The child restraint of claim 2, wherein the first end of the return spring is coupled to the rod mover and the opposite second end of the return spring is coupled to the headrest.

4. The child restraint of claim 3, wherein the headrest includes a front plate coupled to the pivot post and a rear plate arranged to lie in a position between the front plate and the backrest and the opposite second end of the return spring is coupled to the rear plate of the headrest.

5. The child restraint of claim 4, wherein the return spring is arranged to lie in a space provided between the horizontal pivot axis and the headrest-retainer rod.

6. The child restraint of claim 2, wherein the first end of the return spring is coupled to the headrest and the opposite second end of the return spring is coupled to the mover actuator.

7. The child restraint of claim 6, wherein the mover actuator includes a lower portion arranged to interconnect the handle and the pivot mount and the opposite second end of the return spring is coupled to the handle.

8. The child restraint of claim 7, wherein the return spring is arranged to lie in a space provided between the headrest and the handle.

9. The child restraint of claim 7, wherein the headrest is hollow and formed to include an interior region, the lower portion of the mover actuator is arranged to lie in the interior region, and the handle is arranged to lie outside of the interior region.

10. The child restraint of claim 2, wherein the headrest is formed to include a handle-receiving chamber and the handle of the mover actuator is arranged to lie above the rod-receiving notches formed in the headrest lock and to lie and move in the handle-receiving chamber during pivoting movement of the release lever about the horizontal pivot axis.

11. The child restraint of claim 10, wherein the first end of the return spring is coupled to the headrest and the opposite second end of the return spring is coupled to the handle.

12. The child restraint of claim 10, wherein the headrest includes a front plate arranged to face toward a head of a child seated in the seat shell on the seat bottom and a rear plate arranged to lie between the front plate and the backrest and formed to include a rearward-facing aperture opening into the handle-receiving chamber, the handle includes a finger-grip portion exposed in the rearward-facing aperture to be gripped by a caregiver and arranged to be moved toward the front plate by a caregiver to cause the release lever to pivot about the horizontal pivot axis to compress the return spring and move the headrest-retainer rod from the locked position to the unlocked position.

13. The child restraint of claim 12, wherein the rear plate and the front plate cooperate to form an interior chamber and a lower portion of the mover actuator extending between the pivot mount and the handle is arranged to lie and move in the interior chamber during pivoting movement of the release lever about the horizontal pivot axis and movement of the handle in the handle-receiving chamber toward and away from the front plate.

14. The child restraint of claim 12, wherein the first end of the return spring is coupled to the front plate and the opposite second end of the return spring is coupled to the finger-grip portion.

15. The child restraint of claim 1, wherein the headrest is hollow and formed to include an interior region and the return spring is located in the interior region.

16. The child restraint of claim 15, wherein the headrest includes a front plate and a rear plate positioned to lie between the front plate and the front portion of the backrest and to cooperate with the front plate to define the interior region of the headrest therebetween and a first end of the return spring is coupled to the release lever and an opposite second end of the return spring is coupled to the rear plate.

17. The child restraint of claim 16, wherein the release lever is mounted on the front plate for movement about the horizontal pivot axis in the interior region relative to the front and rear plates.

18. The child restraint of claim 16, wherein the horizontal pivot axis is arranged to extend through a portion of the front plate and the return spring is arranged to lie in a space between the horizontal pivot axis and the headrest-retainer rod.

19. The child restraint of claim 15, wherein the release lever includes a rod mover arranged to extend through the interior region of the headrest and coupled to the headrest-retainer rod at a location outside of the interior region of the headrest, a pivot mount coupled to the headrest to establish the horizontal pivot axis and support the rod mover for pivotable movement in the interior region of the headrest to change the position of the headrest-retainer rod relative to the rod receiver, and a mover actuator arranged to extend through the interior region of the headrest upwardly from the pivot mount and configured to provide a handle arranged to move relative to the headrest during pivoting movement of the release lever about the horizontal pivot axis and configured to be gripped by a caregiver pivoting the release lever about the horizontal pivot axis.

20. The child restraint of claim 19, wherein the first end of the return spring is coupled to the rod mover and the opposite second end of the return spring is coupled to the headrest.

21. The child restraint of claim 1, further comprising a child-restraint harness coupled to the seat shell and configured to include first and second shoulder belts, and wherein the backrest is formed to include separate first and second belt-receiving channels, the first shoulder belt is arranged to pass through the first belt-receiving channel, the second shoulder belt is arranged to pass through the second belt-receiving channel, the headrest-height controller further includes a first guide element coupled to the headrest-retainer rod to move therewith relative to the backrest and to the first shoulder belt and a first slidable block mounted on the backrest to slide up and down relative to the seat bottom along the first belt-receiving channel formed in the backrest, and the first guide element is mounted on the first slidable block to swivel about a swivel axis relative to the first slidable block to cause the first slidable block to move up and down along the first belt-receiving channel formed in the backrest in response to up-and-down movement of the first guide element caused by up-and-down movement of the headrest-retainer rod relative to the rod receiver coupled to the backrest.

22. The child restraint of claim 21, wherein the backrest includes first and second flanges arranged to lie in spaced-apart relation to one another and to border the first belt-receiving channel formed in the backrest and the first slidable block includes a first flange arranged to slidably engage the first flange included in the backrest and a second flange arranged to slidably engage the second flange included in the backrest.

23. The child restraint of claim 22, wherein the first and second flanges of the first slidable block are arranged to lie in substantially spaced-apart parallel relation to one another and in substantially perpendicular relation to the swivel axis associated with the first slidable block and the first guide element.

24. A child restraint comprising
a base providing a seat bottom,
a backrest extending upwardly from the base,
a headrest mounted for up-and-down movement on the backrest relative to the seat bottom,
a child-restraint harness associated with the backrest and configured to include at least two shoulder belts,
a headrest-height controller arranged to adjust the height of the headrest above the seat bottom, wherein the headrest-height controller comprises a release lever being pivotable about a horizontal pivot axis with respect to the headrest, a track coupled to the backrest and provided with at least two recesses and a rod coupled to the release lever and position able in a selected one of the recesses, characterized in that a first of the shoulder belts is guided for movement relative to the backrest by a guide element from a back side of the backrest to a front side of the backrest and the guide element is coupled to the first of the shoulder belts and to the rod; and
characterized in that the guide element is swivelable about a swivel axis relative to the headrest.

25. The child restraint of claim 24, characterized in that at least one spring is arranged to extend between the headrest and the release lever to urge the rod into engagement with one of the recesses formed in the track coupled to the backrest.

26. A child restraint comprising
a seat shell including a base providing a seat bottom and a backrest extending upwardly from the base, the backrest having a front portion facing toward a child seated on the seat bottom and cooperating with the seat bottom to form a child-receiving space above the seat bottom and a rear portion facing away from a child seated on the seat bottom and located in the child-receiving space,
a headrest mounted for up-and-down movement on the backrest,
a headrest-height controller arranged to adjust the height of the headrest above the seat bottom, wherein the headrest-height controller includes a headrest lock and a headrest-lock release, wherein the headrest lock includes a rod receiver coupled to the rear portion of the backrest and arranged to extend away from the front portion of the backrest, the headrest lock is formed to include a series of rod-receiving notches having openings facing away from the headrest, each rod-receiving notch being located at a different elevation above the seat bottom, and a headrest-retainer rod arranged to move relative to the rod receiver between a locked position engaging a selected first of the rod-receiving notches of the rod receiver to retain the headrest in a selected position on the backrest to establish the elevation of the headrest above the seat bottom and an unlocked position disengaging rod-receiving notches formed in the rod receiver to free the headrest for up-and-down movement relative to the backrest to assume a different selected fixed position on the backrest associated with a selected second of the rod-receiving notches to establish a new elevation of the headrest above the seat bottom, and wherein the headrest-lock release includes a release lever mounted for pivotable movement on and relative to the headrest about a horizontal pivot axis in response to application of a pivot-inducing force to the release lever by a caregiver to move the headrest-retainer rod in a direction away from the rear portion of the backrest and relative to the rod receiver from the locked position to the unlocked position and a return spring coupled at a first end thereof to the headrest and at an opposite second end thereof to the release lever and configured to provide means for yieldably urging the headrest-retainer rod in a direction toward the rear portion of the backrest and into a rod-receiving notch upon arrival of the headrest-retainer rod in a position confronting the rod-receiving notch once a caregiver lets go of the release lever to allow pivoting movement of the release lever about the horizontal pivot axis so as to retain the headrest in a selected one of the fixed positions on the backrest, and wherein the release lever includes a pivot mount including a pivot post intersecting the horizontal pivot axis and extending into a post receiver formed in the headrest for rotative bearing engagement therein and pivotable movement about the horizontal pivot axis, a rod mover extending downwardly from the pivot mount in a direction toward the seat base to engage the headrest-retainer rod, and a mover actuator extending upwardly from the pivot mount in a direction away from the seat base and providing a handle arranged to move relative to the headrest during pivoting movement of the release lever about the horizontal pivot axis and configured to be gripped by a caregiver pivoting the release lever about the horizontal pivot axis.

27. A child restraint comprising a seat shell including a base providing a seat bottom and a backrest extending upwardly from the base, the backrest having a front portion facing toward a child seated on the seat bottom and cooperating with the seat bottom to form a child-receiving space above the seat bottom and a rear portion facing away from a child seated on the seat bottom and located in the child-receiving space, a headrest mounted for up-and-down movement on the backrest, a headrest-height controller arranged to adjust the height of the headrest above the seat bottom, wherein the headrest-height controller includes a headrest lock and a headrest-lock release, wherein the headrest lock includes a rod receiver coupled to the rear portion of the backrest and arranged to extend away from the front portion of the backrest, the headrest lock is formed to include a series of rod-receiving notches having openings facing away from the headrest, each rod-receiving notch being located at a different elevation above the seat bottom, and a headrest-retainer rod arranged to move relative to the rod receiver between a locked position engaging a selected first of the rod-receiving notches of the rod receiver to retain the headrest in a selected position on the backrest to establish the elevation of the headrest above the seat bottom and an unlocked position disengaging rod-receiving notches formed in the rod receiver to free the headrest for up-and-down movement relative to the backrest to assume a different selected fixed position on the backrest associated with a selected second of the rod-receiving notches to establish a new elevation of the headrest above the seat bottom, and wherein the headrest-lock release includes a release lever mounted for pivotable movement on and relative to the headrest about a horizontal pivot axis in response to application of a pivot-inducing force to the release lever by a caregiver to move the headrest-retainer rod in a direction away from the rear portion of the backrest and relative to the rod receiver from the locked position to the unlocked position and a return spring coupled at a first end thereof to the headrest and at an opposite second end thereof to the release lever and configured to provide means for yieldably urging the headrest-retainer rod in a direction toward the rear portion of the backrest and into a rod-receiving notch upon arrival of the headrest-retainer rod in a position confronting the rod-receiving notch once a caregiver lets go of the release lever to allow pivoting movement of the release lever about the horizontal pivot axis so as to retain the headrest in a selected one of the fixed positions on the backrest, wherein the headrest is hollow and formed to include an interior region and the return spring is located in the interior region, and wherein the release lever includes a rod mover arranged to extend through the interior region of the headrest and coupled to the headrest-retainer rod at a location outside of the interior region of the headrest, a pivot mount coupled to the headrest to establish the horizontal pivot axis and support the rod mover for pivotable movement in the interior region of the headrest to change the position of the headrest-retainer rod relative to the rod receiver, and a mover actuator arranged to extend through the interior region of the headrest upwardly from the pivot mount and configured to provide a handle arranged to move relative to the headrest during pivoting movement of the release lever about the horizontal pivot axis and configured to be gripped by a caregiver pivoting the release lever about the horizontal pivot axis.

28. A child restraint comprising a seat shell including a base providing a seat bottom and a backrest extending upwardly from the base, the backrest having a front portion facing toward a child seated on the seat bottom and cooperating with the seat bottom to form a child-receiving space above the seat bottom and a rear portion facing away from a child seated on the seat bottom and located in the child-receiving space, a headrest mounted for up-and-down movement on the backrest, a headrest-height controller arranged to adjust the height of the headrest above the seat bottom, wherein the headrest-height controller includes a headrest lock and a headrest-lock release, wherein the headrest lock includes a rod receiver coupled to the rear portion of the backrest and arranged to extend away from the front portion of the backrest, the headrest lock is formed to include a series of rod-receiving notches having openings facing away from the headrest, each rod-receiving notch being located at a different elevation above the seat bottom, and a headrest-retainer rod arranged to move relative to the rod receiver between a locked position engaging a selected first of the rod-receiving notches of the rod receiver to retain the headrest in a selected position on the backrest to establish the elevation of the headrest above the seat bottom and an unlocked position disengaging rod-receiving notches formed in the rod receiver to free the headrest for up-and-down movement relative to the backrest to assume a different selected fixed position on the backrest associated with a selected second of the rod-receiving notches to establish a new elevation of the headrest above the seat bottom, and wherein the headrest-lock release includes a release lever mounted for pivotable movement on and relative to the headrest about a horizontal pivot axis in response to application of a pivot-inducing force to the release lever by a caregiver to move the headrest-retainer rod in a direction away from the rear portion of the backrest and relative to the rod receiver from the locked position to the unlocked position and a return spring coupled at a first end thereof to the headrest and at an opposite second end thereof to the release lever and configured to provide means for yieldably urging the headrest-retainer rod in a direction toward the rear portion of the backrest and into a rod-receiving notch upon arrival of the headrest-retainer rod in a position confronting the rod-receiving notch once a caregiver lets go of the release lever to allow pivoting movement of the release lever about the horizontal pivot axis so as to retain the headrest in a selected one of the fixed positions on the backrest, and further comprising a child-restraint harness coupled to the seat shell and configured to include first and second shoulder belts, and wherein the backrest is formed to include separate first and second belt-receiving channels, the first shoulder belt is arranged to pass through the first belt-receiving channel, the second shoulder belt is arranged to pass through the second belt-receiving channel, the headrest-height controller further includes a first guide element coupled to the headrest-retainer rod to move therewith relative to the backrest and to the first shoulder belt and a first slidable block mounted on the backrest to slide up and down relative to the seat bottom along the first belt-receiving channel formed in the backrest, and the first guide element is mounted on the first slidable block to swivel about a swivel axis relative to the first slidable block to cause the first slidable block to move up and down along the first belt-receiving channel formed in the backrest in response to up-and-down movement of the first guide element caused by up-and-down movement of the headrest-retainer rod relative to the rod receiver coupled to the backrest.

* * * * *